United States Patent
Kornhoff

(12) 
(10) Patent No.: US 6,655,428 B1
(45) Date of Patent: Dec. 2, 2003

(54) DOWEL HOLE & SLOT CUTTER

(76) Inventor: Keith Kornhoff, 209 Center St., New Milford, NJ (US) 07646

( * ) Notice: Subject to any disclaimer, the term of this patent is extended or adjusted under 35 U.S.C. 154(b) by 0 days.

(21) Appl. No.: 10/064,030

(22) Filed: Jun. 4, 2002

Related U.S. Application Data

(60) Provisional application No. 60/319,150, filed on Mar. 19, 2002.

(51) Int. Cl.$^7$ ............................. B27C 5/10; B27F 5/02
(52) U.S. Cl. .................. 144/136.95; 144/82; 144/48.6; 408/87; 408/91; 408/712; 408/1 R
(58) Field of Search ................................ 144/2.1, 48.6, 144/136.95, 82, 136.1, 83; 408/87, 91, 99, 100, 110, 111, 112, 712, 1 R

(56) References Cited

U.S. PATENT DOCUMENTS

| | | | | |
|---|---|---|---|---|
| 3,087,520 A | * | 4/1963 | Fielder | 144/136.95 |
| 4,057,358 A | * | 11/1977 | Young | 408/712 X |
| 4,235,565 A | * | 11/1980 | Albano | 408/712 X |
| 4,909,680 A | * | 3/1990 | Wolff | 144/136.95 X |
| 5,657,804 A | * | 8/1997 | Lee | 144/136.95 |
| 5,875,826 A | * | 3/1999 | Giousos | 144/136.95 |

* cited by examiner

*Primary Examiner*—W. Donald Bray
(74) *Attorney, Agent, or Firm*—Richard A. Joel

(57) ABSTRACT

A dowel hole and slot cutter comprise a motor having a base slidably mounted on a track and a cylindrical cutting bit mounted at one end of the motor and extending outwardly therefrom. A support includes a pair of arms with one arm extending upwardly from each side of the track and a cross-portion joining the arms and having an aperture extending therethrough for movement of the cylindrical cutting bit. A flat member having an aperture therethrough includes a track at its upper and lower end which engages the cross portion of the bracket for movement transverse to the cross portion. In operation, the cutter may be used to drill holes, dowel holes, or slots in a fast efficient manner. A polycarbonate member having a elongated slot for the cylindrical cutting bit is mounted between the flat member and a adjustable support member, which includes a perpendicular portion extending outwardly therefrom and two portions extending downwardly from the perpendicular portion therefrom.

16 Claims, 6 Drawing Sheets

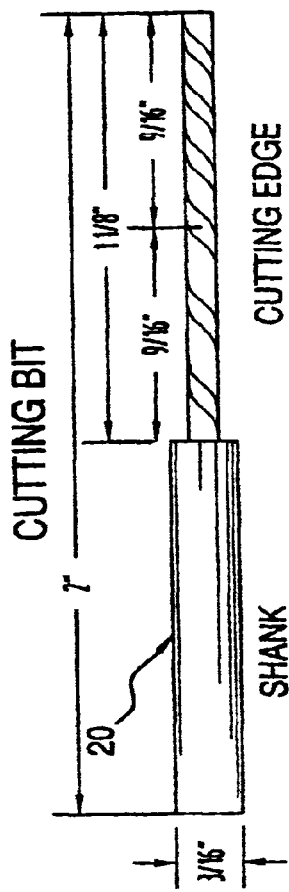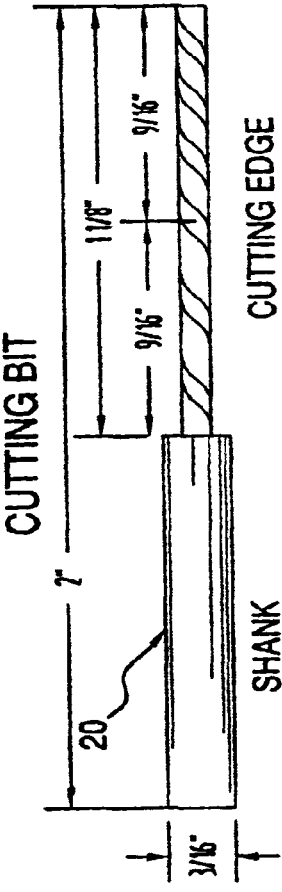
FIG.6

DOWEL HOLE & SLOT CUTTER

CROSS REFERENCE TO RELATED APPLICATIONS

This application is based upon applicant's provisional application No. 60/319,150 filed Mar. 19, 2002.

BACKGROUND OF THE INVENTION

This invention relates to a slot cutter, mortise maker, doweling and drill press device, which operate along two axis and may be hand held. The device is adjustable to accommodate different thickness and width of wood and operates at different speeds depending upon the work being performed.

The prior art includes U.S. Pat. No. 6,295,905 to Hargis, et al, which discloses a toolholder with a removable head wherein a toolholder apparatus is provided for holding a cutting tool adjacent a rotating workpiece. This apparatus includes a mounting block base and a mounting block body slidably supported on the base.

U.S. Pat. No. 4,494,895 to Leaf, discloses a portable drill mechanism characterized by a support post, a drill support assembly coupled to the support post and clamping members removably attached to the support post. While this patent discloses a drill press mechanism employing an electric handheld drill, the main gist of the invention is the adjustment mechanism for moving the electric drill in a predetermined manner.

U.S. Pat. No. 6,263,929 to Aziz, et al, discloses a dowel maker having a first rough sizing blade attached to a body with a micro-adjust assembly for adjusting blade position and a second finish-cutting blade also attached to a body with a micro-adjust assembly for adjusting blade position. U.S. Pat. No. 6,247,879 to Costa, discloses a handheld drill press for enabling a power hand drill to be converted into a drill press. Basically, the invention includes a hollow cylindrical sleeve having an open upper end and an open lower end and cylindrical sidewalls therebetween. The drill press is positioned in the open end.

Other patents of interest include U.S. Pat. No. 5,881,784 to Morikawa, et al; patent 5,273,092 to Shibata; U.S. Pat. No. 5,816,300 to Rogers; U.S. Pat. No. 6,004,082 to Ruhimann, et al; and U.S. Pat. No. 6,296,599 to Staiger.

None of the foregoing patents appear to disclose the inventive concepts involving the multipurpose hand held tool of this intention.

SUMMARY OF INVENTION

This invention relates to a unique multipurpose tool, which can be used for such disparate operations as drilling, slot cutting, doweling and mortise and tenon making. The tool functions along two axes and at different predetermined speeds. In other words, the tool can act either as a router or a drill and can be hand held. Portability is a feature of this invention.

The invention comprises a motor mounted on a track and moveable back and forth along said track with a cylindrical cutting bit for slot cutting. A drill bit or center cut end mill is mounted to one end of the motor and extends outwardly for dowel cutting. Hole saws, carbide bits and drills are also used when used as drill press. Bracket arms extend upwardly on each side of the track base and are joined by a transverse apertured portion extending across the track. A plate having an aperture adjacent the bracket aperture is mounted thereto on one side and includes a track mounted to the upper and lower portion thereof, which engages the upper and lower portion of the transverse bracket portion. This permits movement of the plate perpendicularly to the bracket and motor. An adjustable plastic member with a scale marked thereon and having a slotted aperture is mounted to the other side of the plate and a support member having an oval aperture and a horizontal support portion is adjustably mounted thereto to support a workpiece.

The apertures are aligned to guide the cutting tool in various operations such as slot cutting in two planes, drilling, etc. The motor slides on the track to perform a cutting or drilling operation while the support may be moved at a right angle thereto to create a slot.

Accordingly, an object of this invention is to provide a new and improved economical tool for drilling, slot cutting, dowel hole cutting and mortise and tenon making.

Another object of this invention is to provide a new and improved hand held cutting tool for a variety of operations which functions in two planes.

A further object of this invention is to provide a new and improved cutting and drilling tool that includes a track mounted cutting tool and motor that is precisely positioned with regard to a workpiece held on an integral support.

A more specific object of this invention is to provide a new and improved portable tool for drilling and cutting including a track mounted motor and cylindrical cutting bit and fence/slide assembly that is coupled to the motor for transverse movement relative thereto.

BRIEF DESCRIPTION OF THE DRAWINGS

The above and other objects of the invention may be more readily seen when viewing in conjunction with the accompanying drawings wherein.

FIG. 1a is an end view of the motor assembly track as noted in FIG. 1.

FIG. 6 are examples of specialty cylindrical cutting bits for cutting vertically long or horizontally long slots for biscuit type fasteners.

DETAILED DESCRIPTION

Figure 1:
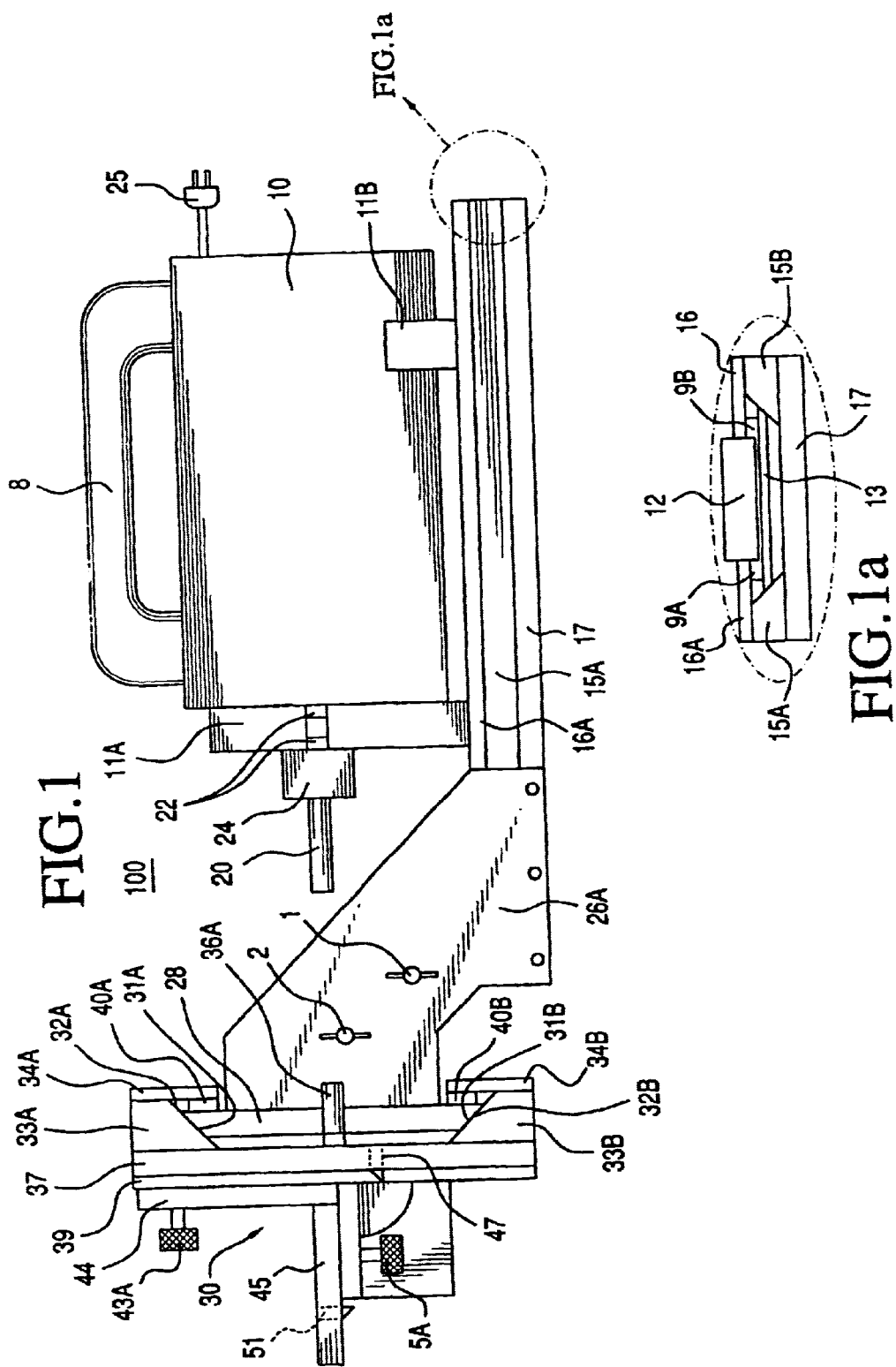
FIG. 1 is a side view of the invention.
Figure 2:
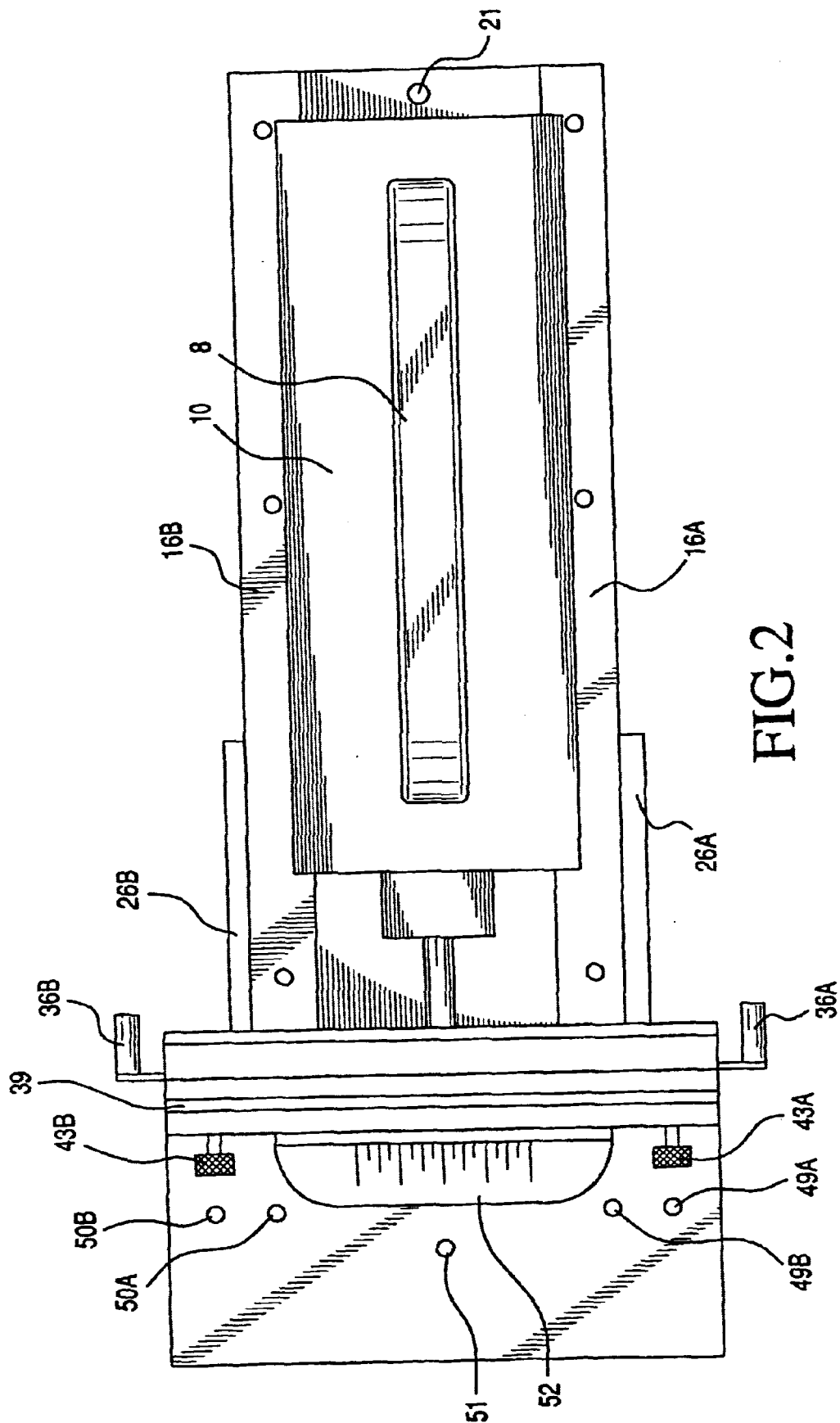
FIG. 2 is a top view of the invention with the motor in a forward position.
Figure 3:
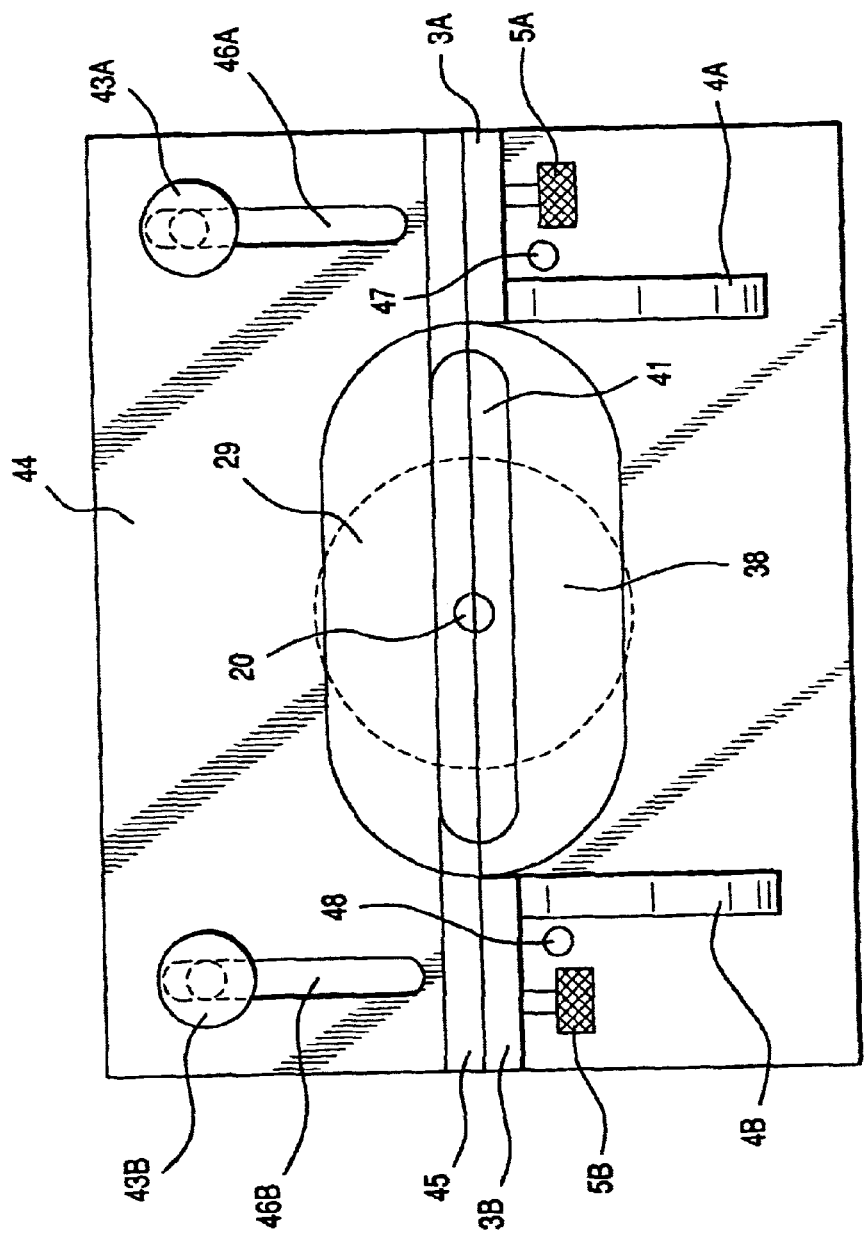
FIG. 3 is a front view of the invention showing the motor in a retracted position.
Figure 4:
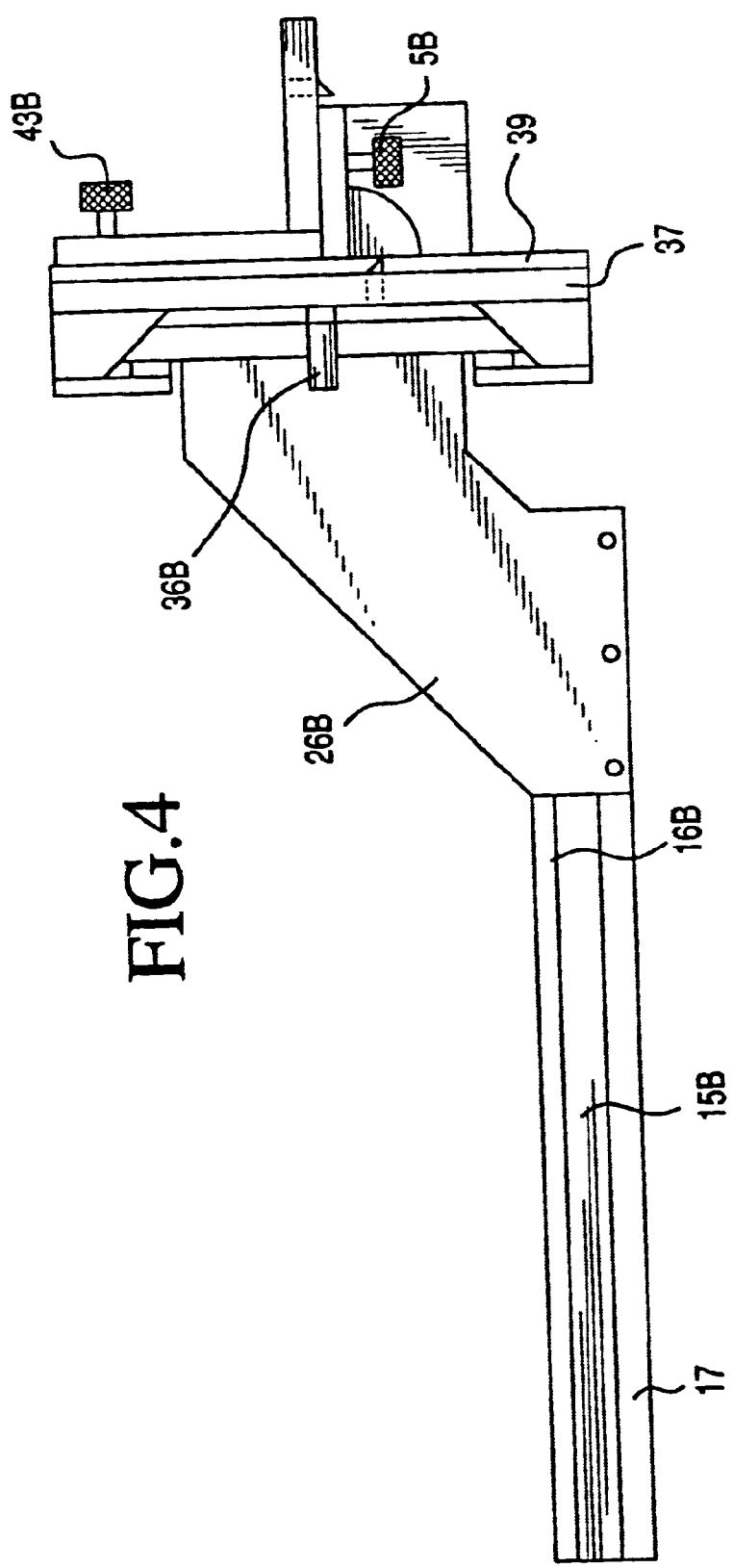
FIG. 4 is a view of the opposite side of the invention with the motor removed.

Referring now to the drawings, the invention as best shown in FIG. 1 and FIG. 1a and comprises, a dowel hole and slot cutter 100 including a motor 10 mounted on two motor mounts, 11a and 11b, to a mounting block 12, and a downwardly extending slideable member 13. The elongated member 13 is positioned within a slot created by side members 15a and 15b which are mounted to base member 17. Members 16a and 16b with force adjustable friction blocks 9a and 9b respectively are mounted downwardly facing member 13 and hold the motor assembly in place and allow for the motor assembly to slide up and down along the base 17. A stop 21 extends upward from the base to limit the rearward motion of the motor assembly while the forward motion is limited by hard stop 1, hard stop 2, or plate 37. A handle 8 is mounted to the motor 10 so that the cutter 100 can be carried about in a portable fashion and to allow for a more precise positioning on the work piece.

A hollow threaded member 22 extends outwardly from the motor 10 at its forward end. A coupling 24 secures an outwardly extending cutting bit 20 to the threaded member 22 to be driven by the motor 10 that is connected by wire 25 to a power source (not shown). Alternatively, the motor 10 may be battery driven.

Bracket arms 26a and 26b are mounted to opposite sides 27a, and 27b of the base 17 and extend upwardly to a transverse member 28 that joins the arms 26a and 26b. The transverse portion 28 includes a centrally located circular aperture 29 through which the cutting bit 20 passes. The upper and lower edges 31a, 31b of the transverse member 28 are inwardly tapered to engage the oppositely tapered edges 32a, 32b of plastic members 33a and 33b and permit movement of the motor assembly in a transverse direction with respect to the fence/slide assembly 30.

The plastic members 33a and 33b, are mounted on opposite sides of plate member 37 to form a track in which the previously described motor and track assembly could move in a side to side direction in addition to the in and out movement of said assembly with respect to the workpiece. Member 37 contains an oval aperture 38, centered in the member, and positioned opposite the aperture 29. The elongated members 34a and 34b with adjustable force friction blocks 40a and 40b mounted to the undersides are downwardly facing transverse member 28 holding the fence/slide assembly to the motor assembly. Adjustable stops 36a and 36b are attached to plate 37 in the track created by members 33a, 33b to allow a adjustable side to side movement from no movement to full movement and increments there of therefore allowing either a hole or a precise size slot to be made.

A polycarbonate member 39 is mounted to back of the plate 37 and includes a slot 41 through which the cutting bit 20 passes. Slot 41 is substantially oval and narrow. The width of slot 41 is slightly larger than the cutting bit 20 to allow it to pass through as well as being slightly wider slot to allow the sideward motion of bit 20 between stops 36a and 36b.

An adjustable fence support 30 is mounted to the plate 37 through the polycarbonate member 39 by the threaded adjustment knobs 43a and 43b for operation by hand. The fence support 30 includes a vertical portion 44, which mounts flush against member 38, and a horizontal portion 45 extending outwardly at a right angle. The fence support 30 includes slots 46a and 46b through which knobs 43a and 43b can be tightened and loosened to permit adjustment of a work piece (not shown) on member 45 to compensate for various workpiece thickness. Anti slide screws 47 and 48 may be positioned outwardly from plate 37 to prevent the cutter 100 from moving while engaging cutting bit 20, Members 3a and 4a form a secondary fence i.e. a subfence or subholder on the right side of the tool face and 3b and 4b form a secondary fence on the left side of tool face. Either or both are held in place by knobs 5a and 5b which are secured to the underside of member 45 using threaded holes 49a, 49h and 50a, 50b respectively allowing for a more precise holding of a workpiece. Member 51 is an antislide screw, which can be mounted into a workpiece from the underside of member 45. Member 45 also contains a scaled polycarbonate component 52 mounted to the underside in the half elongated oval aperture portion used for centering of cutting bit 20 in the slot 41 and to set the side-to-side movement to any precise amount for slot cutting.

In operation, the dowel hole and slot cutter 100 may be hand held or positioned at a fixed station. An advantage of the cutter 100 is that it does the work of large costly fixed machines and has a great deal of mobility since it is portable and can be moved to the workpiece instead of having to manipulate the workpiece to the machine or combine a series of fixtures an tools to get the same results. It is particularly suited for small shops and custom work as well as to the needs of the home handyman. Furthermore, the slot cutter 100 allows a slot to have a flat bottom, deeper than it is wide. With dowel holes, the device can use drill bits, carbide bits for masonry and hole saws due to a large aperture and act as a portable drill press on all materials.

Figure 5:
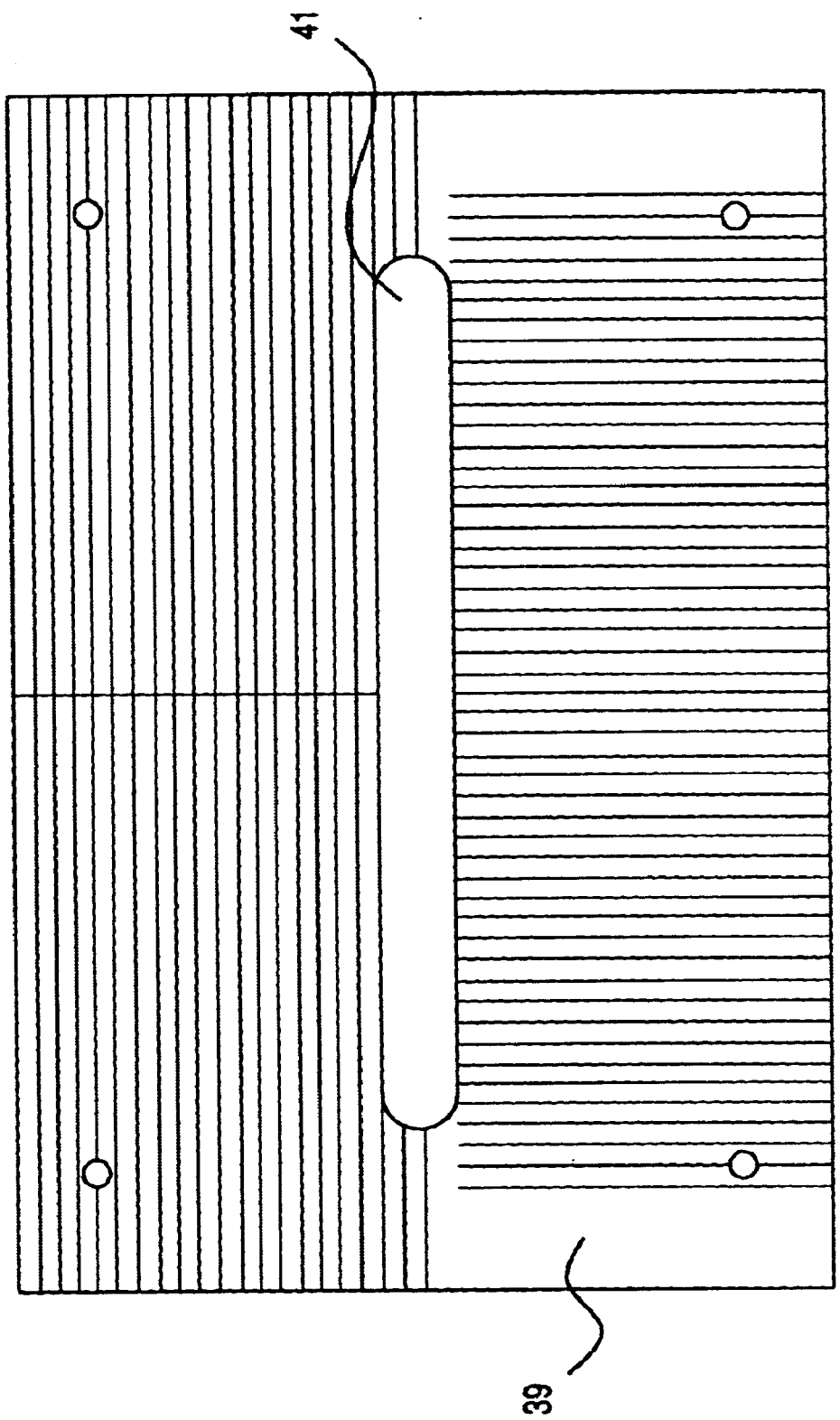
FIG. 5 is a plastic plate with graduated lines to set the height or width of a workpiece.

Typically, horizontal support 45 would be positioned on the workpiece such as a wood structure and the motor 10 moved forward to effect a depth of cut. The fence assembly 44, 45 can be removed and the tool positioned flush to a large workpiece such as a beam or wall. The motor assembly may then be moved side to side to perform the work of a router and cut a slot in a workpiece. Using specialty bits FIG. 6 with a depth of cut of between ¾ and 1½" and a diameter of either ⁹⁄₆₄" or ⁵⁄₃₂" the cutter 100 can cut slots either deeper vertically than horizontal or longer horizontal than deep to allow wood fasteners to be inserted in said slots either vertically or horizontal. The cutter 100 is designed to work at different speeds depending on the operation being performed. The cutter 100 may be used for drilling, slot cutting, dowel hole cutting, and mortise and tenon making. Graduations or a scale are applied to member 39 in both the horizontal and vertical planes as shown in FIG. 5, to facilitate accurate set-ups for depth of workpiece and width of cut or width of workpiece using fence assemblies 44, 45 and 3a, 4a and or 3b, 4b.

While the invention has been explained by a detailed description of certain specific embodiments, it is understood that various modifications and substitutions can be made in any of them within the scope of the appended claims, which are intended also to include equivalents of such embodiments.

What is claimed is:

1. A portable dowel hole and slot cutter including a cutting bit for operating on workpieces compromises:

a motor having a base and a toolholder extending outwardly from the motor at one end;

an elongated track engaged by the motor base to permit sliding movement of the motor along the track having a first side and a second side held in place by two elongated bars with adjustable force friction slides mounted to the underside engaging the motor base;

a bracket having an arm mounted to the track on each side and projecting upwardly therefrom and having a transverse portion including an aperture extending therethrough and having a tapered upper portion and lower portion;

an upper and lower track engaging the upper and lower bracket portions respectively and held in place on a plate by two elongated bars with adjustable force friction slides mounted to the underside engaging the transverse tapered bracket allowing side to side movement;

a workpiece fence/support comprising a vertical portion and a horizontal portion, said vertical portion having two slots for adjusting position of the cutting hit to the workpiece in an up and down fashion with respect to the front face of the cutter and an aperture therethrough adjacent the plate and the transverse bracket and two subholder/subfences comprising a vertical portion and a horizontal portion including a slot and being attached to the horizontal portion of the aforementioned workpiece holder/fence by means of thumbscrews and extending downwardly therefrom with said subholder/subfences being used for positioning the cutting bit with respect to the workpiece along a horizontal axis or in a side to side fashion with respect to the front face of the tool bit with the workpiece holder/fence also held in place with two thumbscrews for adjusting purposes.

2. A portable dowel and slot cutter in accordance with claim 1 further including:

a handle mounted on the top of the motor to facilitate movement of the cutting tool with respect to the workpiece.

3. A portable dowel hole and slot hole cutter in accordance with claim 2 wherein:

the fence/side-slide portion having a metal plate with an oval aperture extending therethrough and having a polycarbonate plate with a oval aperture and horizontal and vertical graduations mounted to the backside of the plate.

4. A portable dowel hole and slot cutter in accordance with claim 3 wherein:

the horizontal fence portion includes a vertical portion along one side which can be adjusted vertically through slots in the vertical portion and held in place with two thumbscrews mounted to the polycarbonate plate and the metal plate including a plurality of graduations vertically and horizontally on the polycarbonate plate and two adjustable sub fences extending downward from either side of the horizontal fence.

5. A portable dowel and slot cutter in accordance with claim 1 wherein:

the motor track includes a stop extending upwardly therefrom to maintain the motor retracted position.

6. A portable dowel hole and slot cutter in accordance with claim 2 wherein:

the motor includes a toolholder including a threaded tool coupling extending outwardly therefrom to permit a cylindrical cutting tool to extend through the respective apertures to engage a workpiece.

7. A portable dowel hole and slot cutter in accordance with claim 4 wherein:

a optional first and second sub-fence containing two components, a vertical and horizontal, extend downward from the horizontal fence and held in place by two thumbscrews.

8. A portable dowel hole and slot cutter in accordance with claim 3 wherein:

two adjustable depth pointed setscrews pass through the metal and polycarbonate plate and engage into the workpiece to prevent slipping of tool along workpiece during use.

9. A portable dowel hole and slot cutter in accordance with claim 4 wherein:

a pointed setscrew passes through the horizontal component facing downwardly to engage workpiece to prevent slipping of the tool along the workpiece during use.

10. A portable dowel and slot cutter in accordance with claim 1 wherein:

the motor includes a forward portion, two motor brackets, a motor mount and a V-shaped base to support and allow movement of the motor assembly along the track.

11. A portable dowel hole and slot cutter in accordance with claim 4 wherein:

a graduated scale is mortised into the underside of the horizontal member of the fence in the oval aperture of said component to facilitate alignment of the cylindrical cutting bit to the workpiece.

12. A portable dowel hole and slot cutter in accordance with claim 3 wherein:

two adjustable stops mounted upwardly facing track mounted on the fence/slide component to prevent side to side movement or to set a precise length of travel to allow for precise size of slot desired.

13. A portable dowel hole and slot cutter in accordance with claim 3 wherein:

adjustable hard stops to allow for precise depth of cut in a workpiece.

14. A portable dowel and slot cutter in accordance with claim 1 wherein:

with all fences removed, can operate as a drill press for accurate holes perpendicular to the workpiece.

15. A portable dowel and slot cutter in accordance with claim 1 wherein:

the motor can be either driven by AC power or battery powered and has various speeds depending on application.

16. A portable dowel and slot cutter in accordance with claim 1 wherein:

a specialty cylindrical cutting hit for a slot cut allowing a biscuit or biscuit type piece of wood to he inserted vertically upward from a workpiece in a slot which is deeper than it is wide or lengthwise instead of horizontally, as well as along a workpiece in a slot that is wider or longer lengthwise than deep with a flat bottom.

* * * * *